(12) United States Patent
Bubendorf et al.

(10) Patent No.: US 12,246,384 B2
(45) Date of Patent: Mar. 11, 2025

(54) SUPPORT FRAME FOR A METHOD FOR SINTERING A BODY, IN PARTICULAR FOR WATCHMAKING

(71) Applicant: Comadur SA, Le Locle (CH)

(72) Inventors: Denis Bubendorf, Bevaix (CH); Pierry Vuille, Les Emibois (CH); Damien Cartier, Besancon (FR); Paulo Arede, La Chaux-de-Fonds (CH)

(73) Assignee: Comadur SA, Le Locle (CH)

( * ) Notice: Subject to any disclaimer, the term of this patent is extended or adjusted under 35 U.S.C. 154(b) by 361 days.

(21) Appl. No.: 17/656,657

(22) Filed: Mar. 28, 2022

(65) Prior Publication Data

US 2022/0355373 A1 Nov. 10, 2022

(30) Foreign Application Priority Data

May 7, 2021 (EP) ..................................... 21172840

(51) Int. Cl.
*C04B 35/10* (2006.01)
*B22F 3/10* (2006.01)
(Continued)

(52) U.S. Cl.
CPC .................. *B22F 3/10* (2013.01); *B22F 5/00* (2013.01); *C04B 35/64* (2013.01); *C21D 9/0025* (2013.01);
(Continued)

(58) Field of Classification Search
CPC ........ F27D 5/00; F27D 5/0006; F27D 3/0021; F27D 3/0022; C21D 9/0025;
(Continued)

(56) References Cited

U.S. PATENT DOCUMENTS 10,265,146 B2 * 4/2019 Reichert ............... F27D 5/0043
10,542,628 B2 * 1/2020 Prest ................... H05K 5/0217
(Continued)

FOREIGN PATENT DOCUMENTS

CN 104948016 A 9/2015
CN 206732130 U 12/2017
(Continued)

OTHER PUBLICATIONS

Office Action issued Mar. 19, 2024, in corresponding Korean Patent Application No. 10-2022-0054949 (with English Translation), 13 pages.
(Continued)

*Primary Examiner* — Gregory A Wilson
(74) *Attorney, Agent, or Firm* — Oblon, McClelland, Maier & Neustadt, L.L.P.

(57) ABSTRACT

A support frame for a sintering step of a method for producing a part, in particular for watchmaking, from a green body having an initial shape, the body shrinking from the initial shape to a final shape during the sintering step, the support frame having at least one face for supporting the body during the sintering step, wherein the geometry of the supporting face is in relief and configured to support the body from its initial shape into its final shape, so that it retains its shape and proportions in line with a shrinkage coefficient related to the sintering operation. The disclosure further relates to a sintering method using this support frame.

12 Claims, 2 Drawing Sheets

(51) Int. Cl.
  *B22F 5/00* (2006.01)
  *C04B 35/64* (2006.01)
  *C21D 9/00* (2006.01)
  *F27D 5/00* (2006.01)
  *G04B 29/02* (2006.01)
  *G04D 3/00* (2006.01)

(52) U.S. Cl.
  CPC ........... *F27D 5/0006* (2013.01); *G04B 29/02* (2013.01); *B22F 2003/1042* (2013.01)

(58) Field of Classification Search
  CPC ........ F27M 2001/1504; B28B 13/0205; B28B 11/005; B28B 13/06; G04D 3/0064; G04D 3/00; C04B 35/10
  See application file for complete search history.

(56) References Cited

U.S. PATENT DOCUMENTS

| | | | | |
|---|---|---|---|---|
| 10,800,108 | B2* | 10/2020 | Mark | B33Y 10/00 |
| 11,097,343 | B2* | 8/2021 | Scalzo | B22F 3/105 |
| 11,511,339 | B2* | 11/2022 | Suzuki | F02C 7/00 |
| 2006/0082033 | A1 | 4/2006 | Hauptmann et al. | |
| 2010/0028645 | A1* | 2/2010 | Maguire | B28B 1/001 |
| | | | | 428/688 |

FOREIGN PATENT DOCUMENTS

| | | | | |
|---|---|---|---|---|
| EP | 0 633 440 | A1 | 1/1995 | |
| EP | 2 266 934 | B1 | 4/2015 | |
| EP | 3964895 | A1 * | 3/2022 | ............. A44C 27/00 |
| JP | 4-338172 | A | 11/1992 | |
| JP | 8-67904 | A | 3/1996 | |
| JP | 2000-26155 | A | 1/2000 | |
| JP | 2000-86357 | A | 3/2000 | |
| JP | 2000-329866 | A | 11/2000 | |
| JP | 2002-536279 | A | 10/2002 | |
| JP | 2006-225186 | A | 8/2006 | |
| JP | 2016-102036 | A | 6/2016 | |
| WO | WO 99/12443 | A1 | 3/1999 | |
| WO | WO-2006114974 | A1 * | 11/2006 | ............. B32B 18/00 |

OTHER PUBLICATIONS

European Search Report issued Oct. 12, 2021 in European Application 21172840.7 filed on May 7, 2021, 3 pages (with English Translation of Categories of Documents).

Japanese Office Action issued Mar. 28, 2023 in Japanese Patent Application No. 2022-053202 (with English Translation), 12 pages.

Combined Chinese Office Action and Search Report issued on Jun. 12, 2024 in Chinese Patent Application No. 202210487866.4 (with English translation of Office Action only), 10 pages.

* cited by examiner

SUPPORT FRAME FOR A METHOD FOR SINTERING A BODY, IN PARTICULAR FOR WATCHMAKING

CROSS-REFERENCE TO RELATED APPLICATION

This application claims priority to European Patent Application No. 21172840.7 filed on May 7, 2021, the entire disclosure of which is hereby incorporated herein by reference.

TECHNICAL FIELD OF THE INVENTION

The invention relates to a support frame for a method for sintering a body, in particular for watchmaking.

The invention further relates to a sintering method using such a support frame.

TECHNOLOGICAL BACKGROUND

One application of the invention lies in the manufacture of an external component intended, preferably but not exclusively, for the watchmaking field. Such a component can be, for example, a watch bezel intended to be fixed to a watch case, a bracelet link, a dial, a watch case, or a clasp component.

Another application of the invention lies in the manufacture of external components used in the mobile and cellular telephony fields, in computer terminals, in particular portable computer terminals, for example to form mobile phone or tablet cases, or in the field of jewellery or tableware, without being limited thereto.

The invention concerns in particular components made of hard materials, i.e. impact- and scratch-resistant materials. These hard materials can in particular be of the advanced ceramics type. Moreover, each component can be made of zirconium dioxide or "zirconia", aluminium dioxide or "alumina", or a composite material incorporating a ceramic substrate and a metal matrix or "cermet". Each component of the external component of the invention can also be made of synthetic ruby or sapphire.

A method is implemented to manufacture these parts, which method comprises the following steps of:
  producing a precursor from a mixture of at least one powder material with a binder;
  forming a green body by injection into a mould or by pressing,
  sintering said green body in order to harden it and obtain the desired part.

The latter step is intended to sinter the green body to form a ceramic body. Preferably, according to the invention, the sintering step can include pyrolysis, for example by thermal debinding.

During the sintering step, the volume of the body decreases due to a shrinkage coefficient caused by the evaporation of the binder and the agglomeration of the powder.

However, the drawback of this method is that the body can become deformed during shrinkage. As it shrinks, the body can lose its shape as a result of gravity, for example. Moreover, the shrinkage coefficient changes depending on the material used to form the part.

Thus, a machining step must generally be carried out on the part in order to finalise the definitive part. The process is thus longer and includes a loss of material which must be added to ensure the necessary final dimensions are obtained.

Another drawback stems from the nature of the material used for the body. The shrinkage coefficient is not always the same and depends on the material chosen. Thus, if the same part is made using different materials, the green body must be sized differently to obtain an identical final body. This makes the sintering step more complex, adds the need for a machining step in order to size the final body, and creates a risk of additional deformation.

SUMMARY OF THE INVENTION

The purpose of the invention is to overcome the aforementioned drawbacks to provide a support frame for a sintering step that avoids the aforementioned problems.

To this end, the invention relates to a support frame for a sintering step of a method for producing a part, in particular for watchmaking, from a green body having an initial shape, the body shrinking from the initial shape to a final shape during the sintering step, the support frame having at least one face for supporting the body during the sintering step.

The support frame is noteworthy in that the geometry of the supporting face is in relief and configured to support the body from its initial shape into its final shape, so that it retains its shape and proportions in line with a shrinkage coefficient related to the sintering operation.

Thus, on the one hand, the support frame allows the proportions of the initial shape of the body to be maintained and prevents the body from becoming deformed during the sintering step. On the other hand, it can be used for bodies made of various ceramic materials each having different shrinkage coefficients.

According to one specific embodiment of the invention, the supporting face comprises at least two parts, each arranged on two different levels, each part being in contact with the body during sintering.

According to one specific embodiment of the invention, one part is intended to be in contact with the body in its final shape and not in its initial shape.

According to one specific embodiment of the invention, the two parts are intended to be in contact with the body in its initial shape and in its final shape.

According to one specific embodiment of the invention, the supporting face comprises a central part and two side parts.

According to one specific embodiment of the invention, the supporting face has a roughness index Ra greater than 1, preferably greater than 3, or even greater than 4, to allow the body to slide during shrinkage.

According to one specific embodiment of the invention, the central part is raised in relation to the side parts.

According to one specific embodiment of the invention, the central part forms a bottom, with the side parts being raised in relation to the central part.

According to one specific embodiment of the invention, the side parts are intended to be in contact with the body in its initial shape and in its final shape.

According to one specific embodiment of the invention, the central part is intended to be in contact with the body in its final shape and not in its initial shape.

According to one specific embodiment of the invention, the central part is intended to be in contact with the body in its final shape and in its initial shape.

According to one specific embodiment of the invention, the supporting face is configured to be arranged relative to the gravitational axis to avoid the risk of gravity-induced deformation.

According to one specific embodiment of the invention, the relief of the support frame is configured to guide the shrinking of the body throughout the sintering step and to preserve the proportions thereof as it shrinks.

According to one specific embodiment of the invention, the support frame comprises a powder applied to the supporting face to allow the body to slide during shrinkage.

The invention further relates to a method for sintering a green body, in particular for watchmaking, the green body having an initial shape, the method comprising the following steps of:
disposing the green body on a support frame according to the invention, such that the green body is at least partially in contact with a first part of the supporting face of the support frame,
sintering the green body on the support frame such that it shrinks from its initial shape to a final shape, the body obtained being at least partially in contact with a second part of the supporting face of the support frame, the second part being different from the first.

BRIEF DESCRIPTION OF THE FIGURES

Other specific features and advantages will be clearly observed in the following description, which is given as a rough guide and in no way as a limited guide, with reference to the accompanying drawings, wherein.

DETAILED DESCRIPTION OF THE INVENTION

As explained hereinabove, the invention relates to a support frame for a part intended to undergo a sintering step of a method for producing a part, in particular for watchmaking. The sintering step consists of sintering a green body having an initial shape. During sintering, the body shrinks to give it a final shape with a shrinkage coefficient relative to the initial shape. Generally, the initial shape has proportions that correspond to the desired shape of the part to be obtained after the sintering step.

In order to preserve this shape, a support frame is used, which has at least one face which supports the body during the sintering step, the geometry of the supporting face being in relief. The relief is configured to support the body in its initial shape and in its final shape, such that the body maintains its proportions with a shrinkage coefficient. The relief of the support frame guides the shrinking of the body throughout the sintering step in order to maintain the shape of the body as it shrinks, regardless of the material that is chosen.

The support frame is preferably made in one piece and comprises, for example, $Al_2O_3$, preferably exclusively. The green body is, for example made of ceramic or metal.

The supporting face comprises a sliding part, over which the body can move as it shrinks. For this purpose, the supporting face has a roughness index Ra greater than 1, preferably greater than 3, or even greater than 4.

Alternatively, a powder spray is applied to the supporting face to allow the body to slide during shrinkage.

Preferably, the supporting face is determined such that it is arranged relative to the gravitational axis to avoid the risk of gravity-induced deformation.

The supporting face comprises at least two parts, each arranged at two different levels, each part being in contact with the body during sintering. Different levels is understood to mean that one part is higher or lower than the other in the relief of the supporting face.

According to an alternative embodiment, one of the parts is intended to be in contact with the body in its final shape and not in its initial shape. Alternatively, the two parts are intended to be in contact with the body in its initial shape and in its final shape.

The figures hereinbelow show different embodiments of the support frame.

Figure 1:
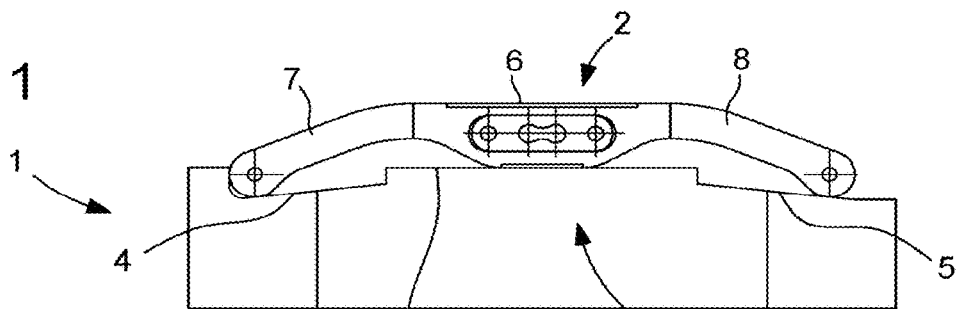
FIG. 1 is a diagrammatic view of a body in its initial shape before the sintering step, the body being arranged on a support frame according to a first embodiment of the invention.

The supporting face of the support frame in FIG. 1 comprises a central part 3 and two side parts 4, 5. The side parts preferably have a roughness index that allows for sliding. Preferably, the central part also has such a roughness. The central part 3 is substantially horizontal and is raised relative to the side parts 4, 5, which slope gently down from the central part 3. The junctions of the central part 3 and of the side parts 4, 5 form a step. The central and side parts are sized so as to allow the body to shrink, regardless of the material that is selected.

The green body is intended, for example, to form a component of a buckle of a bracelet, and comprises a thick portion 6 in the centre and two thin portions 7, 8 on either side to form a one-piece body. The thin portions 7, 8 are curved downwards and extend to below the level of the central portion 6. The green body is disposed on the support frame such that the thick portion 6 rests on the central part 3 of the supporting face, and such that the thin portions 7, 8 each rest on a side part 4, 5 of the supporting face.

Figure 2:
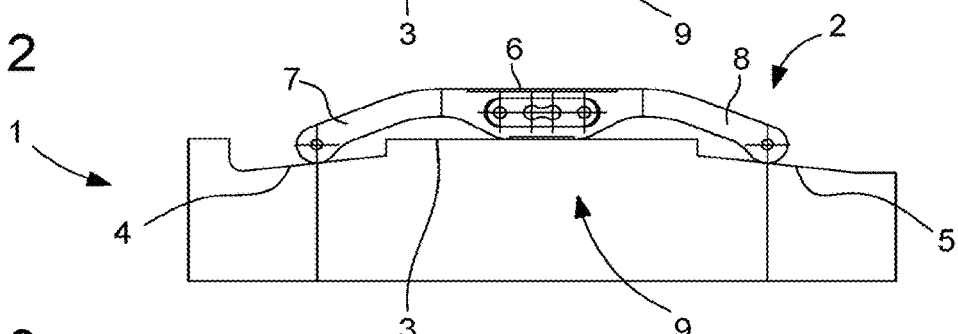
FIG. 2 is a diagrammatic view of a body in its final shape after the sintering step, the body being arranged on the support frame of the first embodiment of the invention.

During the sintering step, the body shrinks to its final shape, which is shown in FIG. 2. The volume of the final body is less than the volume of the initial green body due to shrinkage, but the proportions and shape of the body 2 are substantially preserved. The ends of the thin portions 7, 8 of the body 2 are closer to the central part 3 than to the side parts 4, 5.

Thanks to the support frame, the body does not become deformed during sintering. The relief of the supporting face counteracts the deformation of the body caused by gravity.

For this purpose, the support frame is configured such that the supporting face is oriented perpendicular to the direction of gravity.

Figure 3:
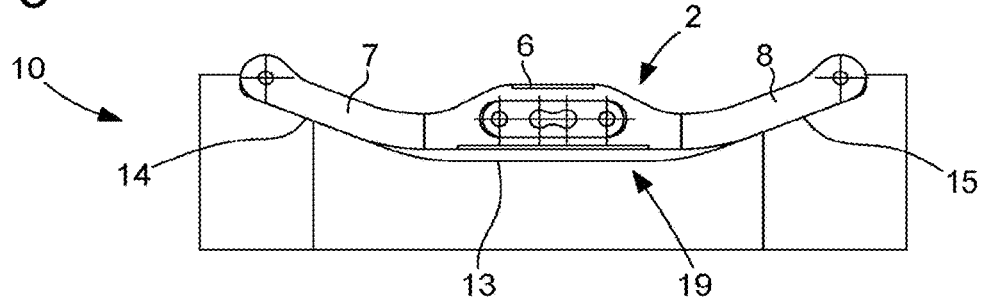
FIG. 3 is a diagrammatic view of a body in its initial shape before the sintering step, the body being arranged on a support frame according to a second embodiment of the invention.
Figure 4:
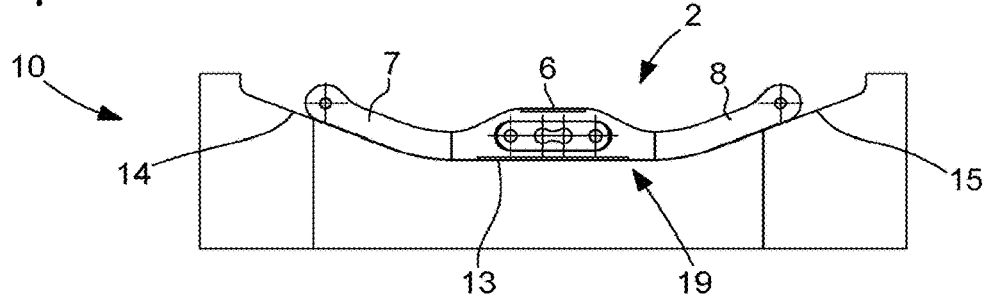
FIG. 4 is a diagrammatic view of a body in its final shape after the sintering step, the body being arranged on the support frame of the second embodiment of the invention.

The second embodiment of the support frame in FIGS. 3 and 4 shows a support frame 10 for sintering a buckle placed the other way around relative to the support frame 1 in FIG. 1 or 2.

The support frame 10 comprises a supporting face provided with a central part 13 forming a bottom and two raised side parts 14, 15. The green body 2 is identical to that in the first embodiment, but is lying upside down on the support frame. Thus, the ends of the thin portions 7, 8 are higher than the thick portion 6.

The side parts 14, 15 are intended to be in contact with the body in its initial shape and in its final shape. Thus, the body 2 is supported by the thin portions 7, 8 in contact with the side parts 14, 15 of the supporting face. The thick portion 6 is suspended in the initial shape of the body.

After the sintering step, shown in FIG. 4, the shrunken body 2 has a reduced volume. Thus, the thick portion 6 rests on the central part 13 of the supporting face. In this embodiment, the central part 13 is intended to be in contact with the body 2 in its final shape and not in its initial shape.

The relief of the supporting face is configured to correspond at least in part to the final shape of the underside of the body 2. Each side part 14, 15 forms an oblique angle with the central part, the angle corresponding to the angle formed by a thin portion 7, 8 with the thick portion 6 of the shape of the body 2.

Figure 5:
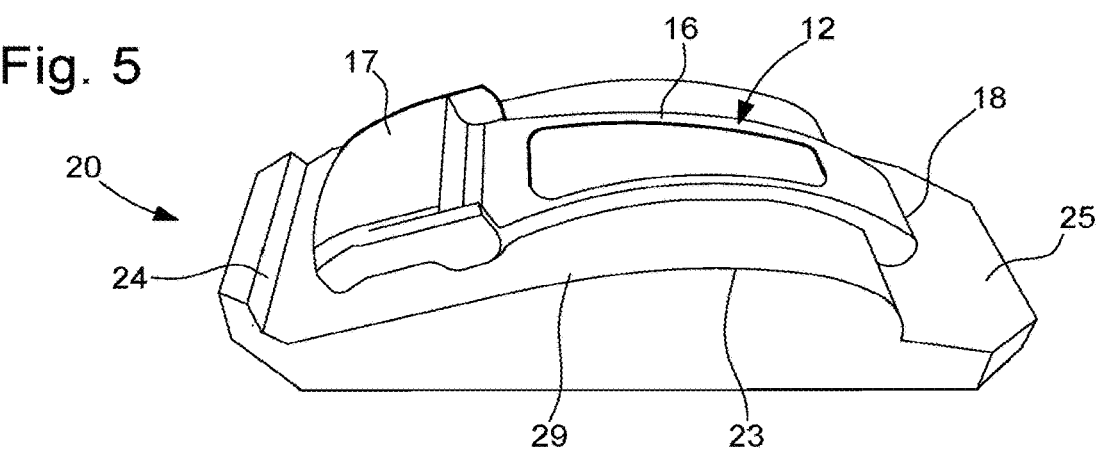
FIG. 5 is a diagrammatic view of a body in its final shape after the sintering step, the body being arranged on a support frame according to a third embodiment of the invention.

FIG. 5 shows a third embodiment of a support frame 20 with a domed or convex central part 23, on which rests a body 12 in its final shape. The body 12 is a bracelet part 16 provided with a buckle 17 and a thick end 18, which is in its final shrunken shape as shown in FIG. 5. The support frame 20 comprises a first raised side part 14 for retaining the buckle 17 in the initial shape of the body 12. The support frame 20 comprises a second side part 25 stepped downwards from the central part 23. The thick end 18 of the bracelet rests on this second side part 25 in its initial shape and in its final shape. After shrinking into its final shape, the thick end 18 touches the step defined by the stepping between the central part 23 and the second side part 25.

Figure 6:
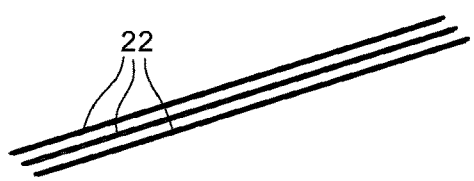
FIG. 6 is a diagrammatic view of a wire-shaped body.
Figure 7:
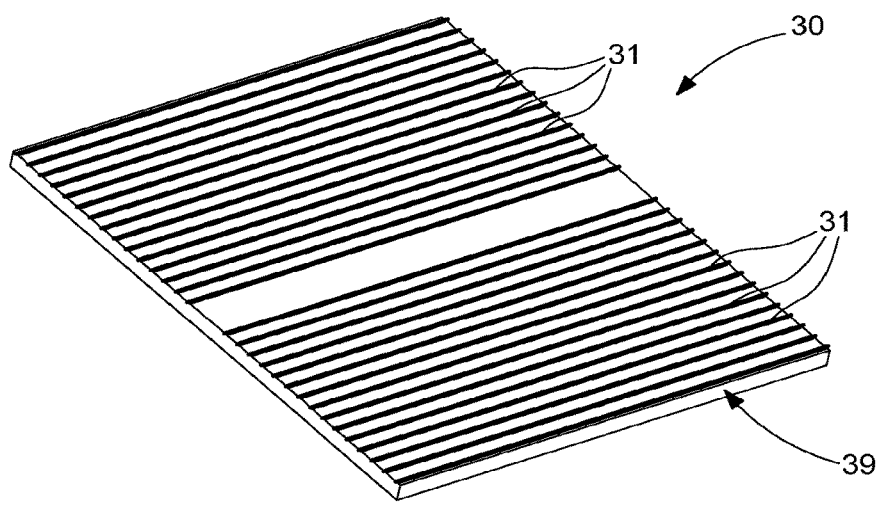
FIG. 7 is a diagrammatic view of a support frame according to a fourth embodiment of the invention, the support frame enabling the wires of FIG. 6 to be produced.

In the fourth embodiment shown in FIG. 7, the support frame 30 is configured to allow for the formation of straight elongated wires 22, shown in FIG. 6. The initial green body has an elongated wire shape, which is to be preserved after sintering, and which is very difficult to preserve without a support frame.

The support frame in FIG. 7 comprises a plurality of grooves 31 for holding the wires 22 during sintering, each groove being intended to hold one wire. The wire-shaped green bodies are disposed in the grooves 31 to prevent the deformation thereof during sintering.

Each groove is provided with a central part forming the bottom of the groove and two raised side parts forming the edges of the groove. The side parts extend away from the central part.

Figure 8:
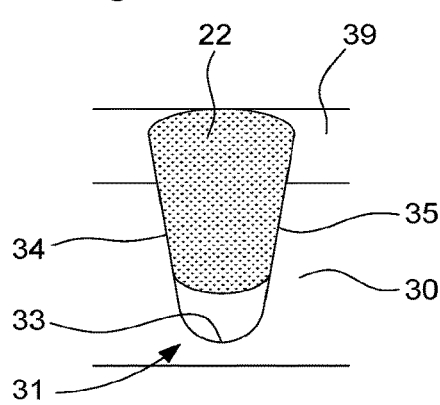
FIG. 8 is a diagrammatic, sectional view of a part of the support frame in FIG. 7, and of a wire in its initial shape.
Figure 9:
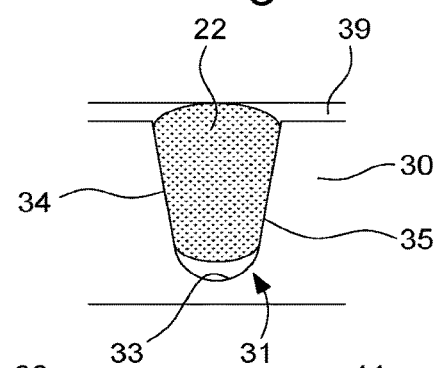
FIG. 9 is a diagrammatic, sectional view of a part of the support frame in FIG. 7, and of a wire in its final shape.

FIGS. 8 and 9 show a first groove profile according to a first alternative embodiment, with the body 22 in its initial shape in FIG. 8 and in its final shape in FIG. 9. In FIG. 8, the wire 22 rests on the two side parts 34, 35 before the sintering step. Thus, the wire does not rest on the central part 33 of the supporting face in its initial shape. The width of the wire 22 is greater than the width of the central part 33.

During sintering, the body 22 shrinks to a final body shape, in this case to the shape of an elongated wire. After the wire has shrunk, its width is smaller than the distance between the two side parts, such that it slides into the groove until it makes contact with the central part 33 of the supporting face, as shown in FIG. 9.

Thanks to the relief of the supporting face of each groove in the support frame, the wire remains straight and does not become deformed.

Figure 10:
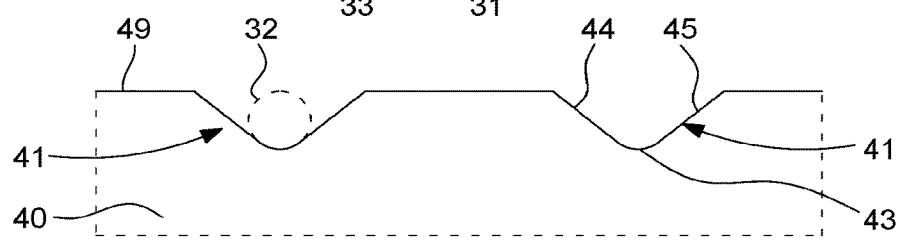
FIG. 10 is a diagrammatic, sectional view of a first alternative embodiment of a part of the support frame in FIG. 7, and of a wire in its final shape.
Figure 11:
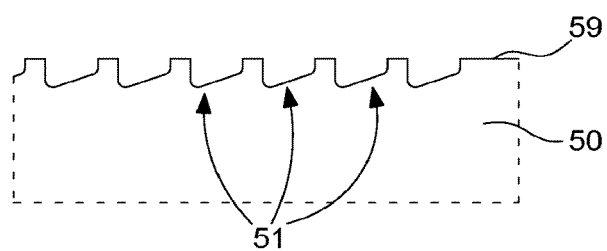
FIG. 11 is a diagrammatic, sectional view of a second alternative embodiment of a part of the support frame in FIG. 7.

FIGS. 10 and 11 show alternative embodiments of the grooves 41, 51 in the support frames 40, 50, with the grooves 41, 51 having different profiles.

The grooves 41 in FIG. 10 have a flared shape, for example with an angle of at least 80° or even at least 100°, and a rounded bottom 43. In its initial shape, the cylindrical body 32 rests on the side parts 44, 45, and in its final shape, the body 32 rests on the rounded bottom 43. The cylindrical shape of the wire is thus preserved during the sintering step.

In the alternative embodiment shown in FIG. 11, the grooves 51 have a shape with a sloping bottom.

The invention further relates to a method for sintering a green body, in particular for watchmaking, the green body having an initial shape.

The method comprises a first step wherein the green body is disposed on a support frame provided with a supporting face in relief according to the invention, such that the green body is at least partially in contact with a first part of the supporting face of the support frame.

The invention comprises a second step wherein the green body is sintered on the support frame such that it shrinks from its initial shape to a final shape. In its final shape, the body is at least partially in contact with a second part of the supporting face of the support frame, the second part being different from the first.

The first and second parts can be oriented differently from one another, in particular relative to gravity.

Preferably, the body slides along the support frame from its initial shape into its final shape during the second step.

The invention claimed is:

1. A support frame for a sintering step of a method for producing a part, in particular for watchmaking, from a green body having an initial shape having a shape in relief, the body shrinking from the initial shape to a final shape during the sintering step, the support frame comprising:
   at least one face for supporting the body during the sintering step, wherein the geometry of the supporting face is in relief and configured to support the body from its initial shape into its final shape, so that it retains its shape and proportions in line with a shrinkage coefficient related to the sintering operation,
   wherein the supporting face comprises a central part and two side parts extending outward from the central part, the central part being raised in relation to the two side parts, and a distal end of a first of the side parts is raised in relation to a distal end of a second of the two side parts.

2. The support frame according to claim 1, wherein the central part is arranged at a different level from the side parts, each part being in contact with the body during sintering.

3. The support frame according to claim 2, wherein the central parts and the side parts are intended to be in contact with the body in its initial shape and in its final shape.

4. The support frame according to claim 1, wherein the side parts are intended to be in contact with the body in its initial shape and in its final shape.

5. The support frame according to claim 1, wherein the central part is intended to be in contact with the body in its final shape and in its initial shape.

6. The support frame according to claim 1, wherein the supporting face has a roughness index Ra greater than 1, to allow the body to slide during shrinkage.

7. The support frame according to claim 1, comprising a powder applied to the supporting face to allow the body to slide during shrinkage.

8. The support frame according to claim 1, wherein the supporting face is configured such that it is orientated perpendicular to a direction of gravity to avoid the risk of gravity-induced deformation.

9. The support frame according to claim 1, wherein the relief of the support frame is configured to guide the shrinking of the body throughout the sintering step and to preserve the proportions thereof as it shrinks.

10. A method for sintering a green body, in particular for watchmaking, the green body having an initial shape, the method comprising the following steps of:
   disposing the green body on a support frame according to claim 1, such that the green body is at least partially in contact with a first part of a supporting face of the support frame,
   sintering the green body on the support frame such that it shrinks from its initial shape to a final shape, the body obtained being at least partially in contact with a second part of a supporting face of the support frame, the second part being different from the first.

11. A support frame for a sintering step of a method for producing a part, in particular for watchmaking, from a green body having an initial shape having a shape in relief, the body shrinking from the initial shape to a final shape during the sintering step, the support frame having at least one face for supporting the body during the sintering step,
   wherein the geometry of the supporting face is in relief and configured to support the body from its initial shape into its final shape, so that it retains its shape and proportions in line with a shrinkage coefficient related to the sintering operation,
   wherein the supporting face comprises at least two parts, each arranged at two different levels, each part being in contact with the body during sintering,
   wherein one of the at least two parts is intended to be in contact with the body in its final shape and not in its initial shape,
   wherein the supporting face comprises a central part and two side parts, and
   wherein the central part forms a bottom, with the side parts being raised in relation to the central part.

12. The support frame according to claim 11, wherein the central part is intended to be in contact with the body in its final shape and not in its initial shape.

* * * * *